(12) United States Patent
Kim et al.

(10) Patent No.: US 12,366,734 B2
(45) Date of Patent: Jul. 22, 2025

(54) OPTICAL IMAGING SYSTEM

(71) Applicant: Samsung Electro-Mechanics Co., Ltd., Suwon-si (KR)

(72) Inventors: Hag Chul Kim, Suwon-si (KR); Yong Joo Jo, Suwon-si (KR); Phil Ho Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 828 days.

(21) Appl. No.: 17/318,221

(22) Filed: May 12, 2021

(65) Prior Publication Data

US 2022/0252847 A1 Aug. 11, 2022

(30) Foreign Application Priority Data

Feb. 10, 2021 (KR) .................... 10-2021-0019050

(51) Int. Cl.
| | |
|---|---|
| *G02B 9/60* | (2006.01) |
| *G02B 9/34* | (2006.01) |
| *G02B 9/62* | (2006.01) |
| *G02B 13/00* | (2006.01) |

(52) U.S. Cl.
CPC .......... *G02B 13/0065* (2013.01); *G02B 9/34* (2013.01); *G02B 9/60* (2013.01); *G02B 9/62* (2013.01); *G02B 13/002* (2013.01)

(58) Field of Classification Search
CPC .... G02B 13/0065; G02B 9/34; G02B 13/002; G02B 13/004; G02B 13/0015; G02B 3/0087; G02B 13/0055; G02B 2003/0093; G03B 30/00

USPC ....................................... 359/754
See application file for complete search history.

(56) References Cited

U.S. PATENT DOCUMENTS

| | | | |
|---|---|---|---|
| 9,989,741 B1 | 6/2018 | Hsueh et al. | |
| 10,338,348 B2 | 7/2019 | Chen et al. | |
| 10,437,017 B2 | 10/2019 | Lin et al. | |
| 2007/0183043 A1* | 8/2007 | Bito | G03B 17/17 |
| | | | 359/557 |
| 2016/0327773 A1 | 11/2016 | Choi et al. | |
| 2017/0108670 A1 | 4/2017 | Ko | |
| 2017/0176717 A1* | 6/2017 | Lai | G02B 9/34 |
| 2017/0276904 A1 | 9/2017 | Lai et al. | |

(Continued)

FOREIGN PATENT DOCUMENTS

| | | |
|---|---|---|
| CN | 106597652 A | 4/2017 |
| CN | 107229102 A | 10/2017 |

(Continued)

OTHER PUBLICATIONS

Korean Office Action issued on Feb. 7, 2023, in counterpart Korean Patent Application No. 10-2021-0019050 (9 pages in English, 7 pages in Korean).

(Continued)

*Primary Examiner* — William R Alexander
*Assistant Examiner* — Mackenzi Waddell
(74) *Attorney, Agent, or Firm* — NSIP Law

(57) ABSTRACT

An optical imaging system includes an optical path folding element, and a lens group including four or more lenses. A rearmost lens disposed closest to an imaging plane in the lens group has positive refractive power, and a rearward lens disposed closest to an object side of the rearmost lens has negative refractive power.

19 Claims, 16 Drawing Sheets

(56) References Cited

U.S. PATENT DOCUMENTS

| | | | |
|---|---|---|---|
| 2018/0059376 A1 | 3/2018 | Lin et al. | |
| 2018/0095244 A1 | 4/2018 | Lin et al. | |
| 2018/0364455 A1* | 12/2018 | Chen | G02B 13/0045 |
| 2019/0056566 A1 | 2/2019 | Yoo et al. | |
| 2019/0212529 A1* | 7/2019 | Ko | G02B 13/0045 |
| 2019/0369363 A1 | 12/2019 | Chen et al. | |
| 2019/0391367 A1 | 12/2019 | Kuo | |
| 2021/0349289 A1* | 11/2021 | Huh | G02B 13/0065 |

FOREIGN PATENT DOCUMENTS

| | | | | |
|---|---|---|---|---|
| CN | 108398765 A | | 8/2018 | |
| CN | 109425967 A | | 3/2019 | |
| CN | 110554478 A | | 12/2019 | |
| CN | 111781701 A | | 10/2020 | |
| CN | 112034595 A | * | 12/2020 | G02B 13/0045 |
| CN | 113625421 A | | 11/2021 | |
| JP | 2016-118736 A | | 6/2016 | |
| KR | 10-2016-0131824 A | | 11/2016 | |
| TW | I647505 B | | 1/2019 | |
| TW | 201905531 A | | 2/2019 | |

OTHER PUBLICATIONS

Chinese Office Action issued on Nov. 28, 2022, in counterpart Chinese Patent Application No. 202210424870.6 (12 pages in English, 12 pages in Chinese).

Taiwanese Office Action issued on Feb. 11, 2022, in counterpart Taiwanese Patent Application No. 110117754 (6 pages in English and 6 pages in Mandarin).

Chinese Office Action Issued on Apr. 16, 2023, in Counterpart Chinese Patent Application No. 202110911907.3 (5 Pages in English, 10 Pages in Korean).

Chinese Office Action issued on Feb. 25, 2023, in counterpart Chinese Patent Application No. 202210424870.6 (8 pages in English, 8 pages in Chinese).

Chinese Office Action issued on Nov. 26, 2021, in counterpart Chinese Patent Application No. 202121863364.4 (2 pages in English and 2 pages in Chinese).

* cited by examiner

OPTICAL IMAGING SYSTEM

CROSS-REFERENCE TO RELATED APPLICATIONS

This application claims the benefit under 35 USC 119(a) of Korean Patent Application No. 10-2021-0019050 filed on Feb. 10, 2021, in the Korean Intellectual Property Office, the entire disclosure of which is incorporated herein by reference for all purposes.

BACKGROUND

1. Field

The present disclosure relates to an optical imaging system realizing high-resolution optical performance.

2. Description of the Background

Optical imaging systems may be mounted in portable terminals. For example, optical imaging systems may be mounted in smartphones, notebook computers, portable game machines, or the like. An optical imaging system may image a person or a landscape disposed to the front or rear of a portable terminal. For example, the optical imaging system may have a wide angle of view to image a person or object located at a short distance or may have a narrow angle of view to image an object located at a distance. The optical imaging system may include a plastic lens to facilitate miniaturization. However, the optical imaging system including a plastic lens may not easily capture high-resolution and high-magnification images. Therefore, an optical imaging system which includes a plastic lens, and which is capable of capturing high-resolution and high-magnification images is required to be developed.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes an optical path folding element, and a lens group including four or more lenses. A rearmost lens disposed closest to an imaging plane in the lens group has positive refractive power, and a rearward lens disposed closest to an object side of the rearmost lens has negative refractive power.

A refractive index of the rearmost lens may be greater than 1.63 and less than 1.69.

A refractive index of the rearward lens may be greater than 1.63 and less than 1.69.

A foremost lens disposed closest to an object in the lens group may have positive refractive power.

The rearmost lens may have a convex object-side surface.

The rearmost lens may have a convex image-side surface.

The rearward lens may have a concave object-side surface.

The rearward lens may have a concave image-side surface.

Where f is a focal length of the optical imaging system and IMGHT is a height of the imaging plane, f/IMGHT may be greater than 8.0 and less than 12.0.

In another general aspect, an optical imaging system includes an optical path folding element, and a lens group including four or more lenses, wherein $0.1 < \text{NGR} - \text{NGF} < 0.16$, where NGR is an average of a refractive index of the rearmost lens disposed closest to the imaging plane and a refractive index of the rearward lens disposed closest to the object side of the rearmost lens in the lens group, and NGF is an average of refractive indices of lenses excluding the rearmost lens and the rearward lens in the lens group.

The rearmost lens may have positive refractive power.

The rearward lens may have negative refractive power.

The optical path folding element may be disposed between lenses of the lens group.

The rearward lens may have a concave object-side surface.

NGF may be greater than 1.50 and less than 1.56.

In another general aspect, an optical imaging system includes an optical path folding element, a lens group including four or more lenses, wherein a rearmost lens disposed closest to an imaging plane in the lens group, and a first rearward lens disposed closest to an object side of the rearmost lens each have a refractive index greater than 1.63 and less than 1.69, and wherein a second rearward lens disposed closest to an object side of the first rearward lens has a convex object-side surface and a convex image-side surface.

The first rearward lens may have negative refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
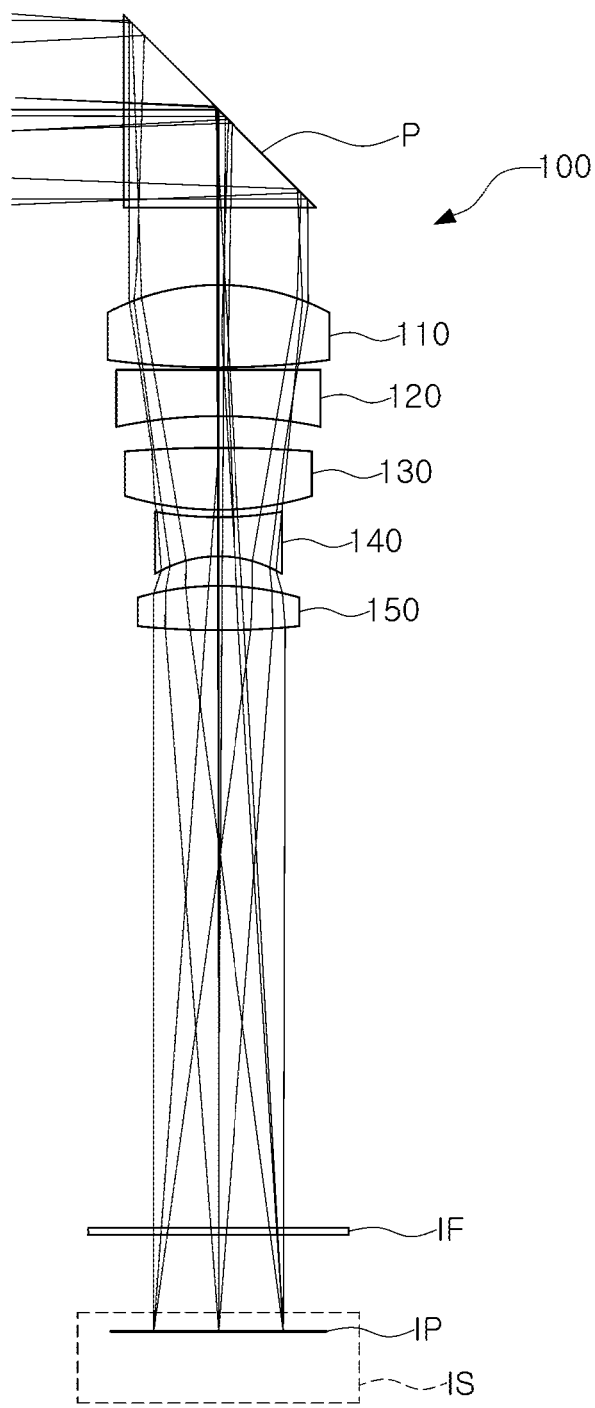
FIG. 1 is a view illustrating a configuration of an optical imaging system according to a first embodiment.
Figure 2:
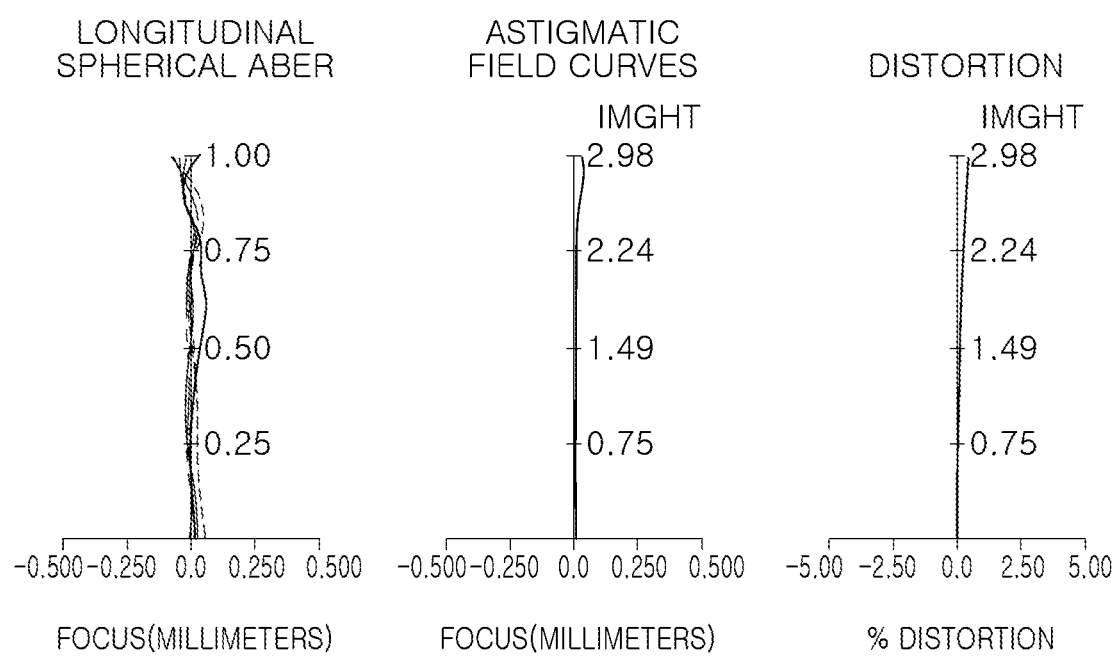
FIG. 2 includes graphs representing aberration curves of the optical imaging system illustrated in FIG. 1.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known in the art may be omitted for increased clarity and conciseness.

Embodiments of this disclosure may provide an optical imaging system realizing high-resolution optical performance, while being mounted in a small portable terminal.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, e.g., as to what an example or embodiment may include or implement, means that at least an example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of this disclosure. Further, even in the case that the examples described herein have a variety of configurations, other configurations are possible as will be apparent after an understanding of the disclosure of this disclosure.

In addition, in the present disclosure, a first lens refers to a lens closest to an object (or a subject). In the present disclosure, the number described in front of the lens refers to the order of the lenses arranged from an object side. For example, a second lens refers to a lens positioned second from the object side, and a third lens refers to a lens positioned third from the object side. In addition, all of radii of curvature, a thickness of lens, a through-the-lens distance along the optical axis from the object-side surface of the first lens to the imaging plane (TTL), a half of a diagonal length of an image plane (IMGHT), and focal lengths are represented by millimeters (mm). In addition, a thickness of a lens, an interval between lenses, and a TTL are distances in an optical axis of a lens. In addition, in descriptions of shapes of lenses, mentioning that one surface is convex means that an optical axis portion of the corresponding surface is convex, and mentioning that one surface is concave means that an optical axis portion of the corresponding surface is concave. Therefore, even in the case that one surface of a lens is described to be convex, edge portions of the lens may be concave. Similarly, even in the case that one surface of a lens is described to be concave, edge portions of the lens may be convex. In the present disclosure, the imaging plane may mean an image forming surface on which a lens is focused or one surface of an image sensor.

The optical imaging system according to an embodiment may include an optical path folding element and a lens group. However, the configuration of the optical imaging system is not limited to the optical path folding element and the lens group. For example, the optical imaging system may further include a stop (iris, diaphragm), a filter, and the like, if necessary.

The optical path folding element may be disposed on one side of the lens group. For example, the optical path folding element may be disposed on an object side of the lens group or an image-side surface of the lens group. However, a position of the optical path folding element is not limited to the object side or the image-side surface of the lens group. For example, it may be possible to arrange the optical path folding element between the lenses constituting the lens group. The optical path folding element may refract or reflect an optical path. For example, the optical path folding element may be a prism refracting light or a reflector reflecting light.

The optical imaging system may include a plurality of optical path folding elements. For example, the optical imaging system may include a first optical path folding element disposed on the object side of the lens group and a second optical path folding element disposed on the image-side surface of the lens group.

The lens group may include a plurality of lenses. For example, the lens group may include four lenses. However, the configuration of the lens group is not limited to four lenses. For example, the lens group may include 5 lenses or 6 lenses. As another example, the lens group may include 7 or more lenses.

The lens group may include a lens having positive refractive power. For example, in the lens group, the rearmost lens disposed closest to the imaging plane may be configured to have positive refractive power.

The lens group may include a lens having negative refractive power. For example, a rearward lens disposed closest to the object side of the rearmost lens in the lens group may have negative refractive power.

The rearmost lens may have a predetermined refractive index. For example, the refractive index of the rearmost lens may be greater than 1.63 and less than 1.69. One side surface of the rearmost lens may have a convex shape. For example, the object-side surface of the rearmost lens may have a convex shape. As another example, the image-side surface of the rearmost lens may have a convex shape.

The rearward lens may have a predetermined refractive index. For example, the refractive index of the rearward lens may be greater than 1.63 and less than 1.69. One side surface of the rearward lens may have a concave shape. For example, the object-side surface of the rearward lens may have a concave shape. As another example, the image-side surface of the rearward lens may have a concave shape.

The lens group may further include a lens having positive refractive power. For example, a foremost lens disposed closest to an object in the lens group may have positive refractive power.

The lenses constituting the lens group are formed of a material having a refractive index different from that of air. For example, a plurality of lenses are formed of plastic or glass. At least one of the plurality of lenses has an aspherical shape. The aspherical surface of the lens is expressed by Equation 1.

$$Z = \frac{cr^2}{1 + \sqrt{1 - (1+k)c^2 r^2}} + Ar^2 + Br^6 + Cr^8 + Dr^{10} + Er^{12} + Fr^{14} + Gr^{16} + Hr^{18} + Jr^{20} \quad \text{Equation 1}$$

In Equation 1, c is the reciprocal of a radius of curvature of a corresponding lens, K is a conic constant, r is a distance from any point on the aspherical surface to an optical axis, A to H and J are aspherical surface constants, Z (or SAG) is a height in an optical axis direction from a certain point on the aspherical surface to a vertex of the corresponding aspherical surface.

The optical imaging system includes a plastic lens. For example, in the optical imaging system, at least one of the lenses constituting the lens group may be formed of a plastic material. The optical imaging system includes an aspherical lens. For example, in the optical imaging system, at least one of the lenses constituting the lens group may be formed as an aspherical lens.

The optical imaging system may further include a filter, a stop, and an imaging plane.

The filter is disposed between the lens group and an image sensor. The filter may block a specific wavelength of light. For example, the filter may block infrared rays. The stop adjusts the amount of light incident on the lens group. The imaging plane may be formed at a point at which an image is formed by the lenses. For example, the imaging plane may be formed on one surface or an inner surface of the image sensor.

The optical imaging system may satisfy one or more of the following conditional expression.

$8.0 < f/IMGHT < 12.0$ $0.10 < NGR-NGF < 0.16$ $1.50 < NGF < 1.56$ $0.80 < TTL/f < 1.20$

In the above conditional expression, f is a focal length of the optical imaging system, IMGHT is a height of the imaging plane (half of a diagonal length of the image plane), NGR is an average of a refractive index of the rearmost lens (a lens disposed closest to the imaging plane) and a refractive index of the rearward lens (a lens disposed closest to the object side of the rearmost lens), NGF is an average of refractive indices of lenses excluding the rearmost lens and the rearward lens in the lens group, and TTL is a distance from the object-side surface of the foremost lens (a lens closest to the object side) to the imaging plane.

The optical imaging system may further satisfy one or more of the following conditional expressions.

$2.0 < f/f1 < 4.0$ $-2.0 < f/f2 < 2.6$ $3.0 < f/fr1 < 6.0$ $-10.0 < f/fr2 < -8.0$

In the conditional expression, f1 is a focal length of the foremost lens (or the first lens), f2 is a focal length of the second lens. disposed closest to the image-side surface of the foremost lens, fr1 is a focal length of the rearmost lens, and fr2 is a focal length of the rearward lens.

The optical imaging system may have a long focal length. For example, the focal length f of the optical imaging system may be 28 mm or more. As another example, the focal length f of the optical imaging system may be 28.0 to 32.0 mm.

Hereinafter, example embodiments of the present disclosure will be described in detail on the basis of the accompanying illustrative drawings.

First, an optical imaging system according to a first example embodiment will be described with reference to FIG. 1.

The optical imaging system 100 may include an optical path folding element. For example, the optical imaging system 100 may include a prism P in the form of an optical path folding element. The prism P is disposed on the object side of the lens group. The prism P may refract or reflect a path of light incident on the optical imaging system 100.

The optical imaging system 100 may include a lens group including a plurality of lenses. For example, the optical imaging system may include a lens group including a first lens 110, a second lens 120, a third lens 130, a fourth lens 140, and a fifth lens 150.

The first lens 110 has positive refractive power and has a convex object-side surface and a convex image-side surface. The second lens 120 has negative refractive power and has a convex object-side surface and a concave image-side surface. The third lens 130 has positive refractive power and has a convex object-side surface and a convex image-side surface. The fourth lens 140 has negative refractive power and has a concave object-side surface and a concave image-side surface. The fifth lens 150 has positive refractive power and has a convex object-side surface and a convex image-side surface.

In the present embodiment, a plurality of lenses disposed close to the imaging plane may have a higher refractive index than other lenses. For example, refractive indices of the fourth and fifth lenses 140 and 150 may be greater than refractive indices of the first to third lenses 110 to 130. To further explain, the refractive indices of the fourth and fifth lenses 140 and 150 are greater than 1.6 and less than 1.7, and the refractive indices of the first to third lenses 110 to 130 are greater than 1.5 and less than 1.6.

The optical imaging system 100 may further include a filter IF and an imaging plane IP.

The filter IF may be disposed on the image side of the lens group to block inflow of foreign substances or incidence of infrared rays. The imaging plane IP may provide a space in which light refracted by the first to fifth lenses 110 to 150 is imaged. The imaging plane IP may be formed on the image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

Figure 3:
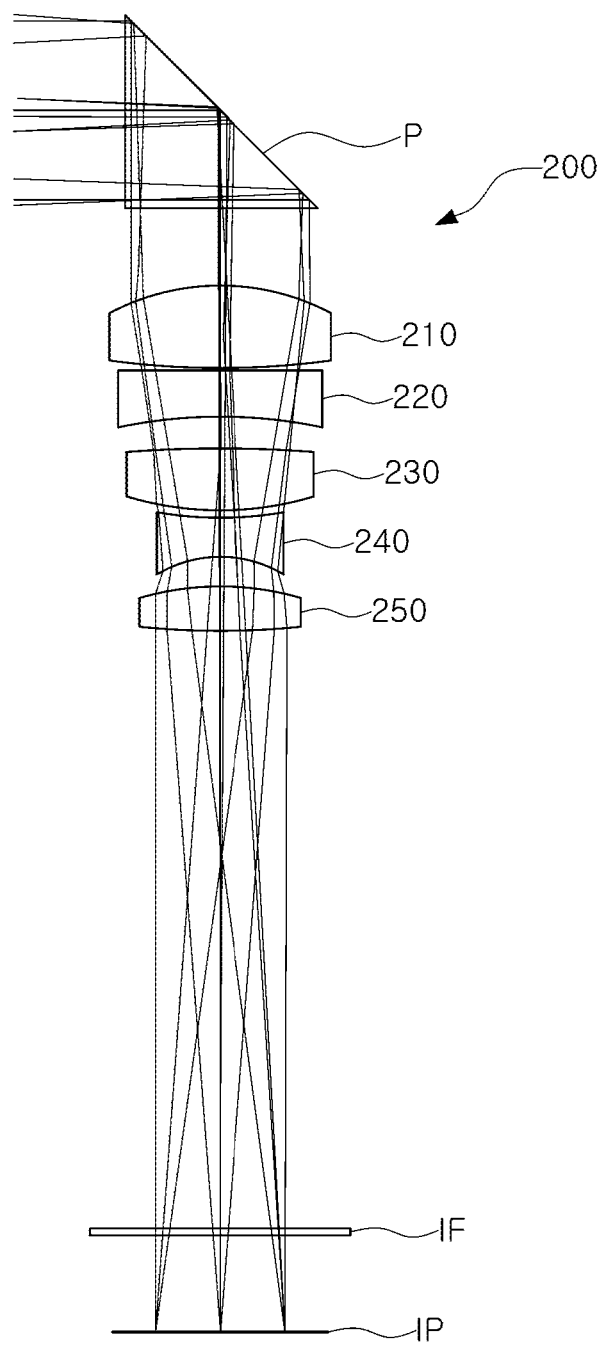
FIG. 3 is a view illustrating a configuration of an optical imaging system according to a second embodiment.

Table 1 illustrates the lens characteristics of the optical imaging system according to the present embodiment, and Table 2 illustrates aspherical values of the optical imaging system according to the present embodiment. FIG. 3 is a view of aberration curves of an optical imaging system according to the present embodiment.

TABLE 1

| Surface No. | Component | Curvature radius | Thickness/ distance | Refractive index | Abbe's number |
|---|---|---|---|---|---|
| S1 | Prism | Infinity | 2.500 | 1.717 | 29.50 |
| S2 | | Infinity | 2.500 | 1.717 | 29.50 |
| S3 | | Infinity | 2.000 | | |
| S4 | First lens | 6.289 | 2.150 | 1.535 | 56.00 |
| S5 | | −52.554 | 0.093 | | |
| S6 | Second lens | 46.666 | 1.197 | 1.535 | 56.00 |
| S7 | | 16.042 | 0.919 | | |
| S8 | Third lens | 25.47413 | 1.518 | 1.535 | 56.00 |
| S9 | | −10.16727 | 0.289 | | |
| S10 | Fourth lens | −7.66112 | 0.790 | 1.639 | 23.50 |
| S11 | | 3.02330 | 0.845 | | |
| S12 | Fifth lens | 9.14160 | 1.200 | 1.671 | 19.20 |
| S13 | | −13.01214 | 15.400 | | |
| S14 | Filter | Infinity | 0.110 | 1.516 | 64.10 |
| S15 | | Infinity | 2.500 | | |
| S16 | Imaging plane | Infinity | −0.010 | | |

TABLE 2

| Surface No. | S4 | S5 | S6 | S7 | S8 |
|---|---|---|---|---|---|
| K | −0.3806802 | −33.8670721 | 51.1016185 | 5.8564147 | 13.1445702 |
| A | 0.0007090 | −0.0007651 | −0.0039577 | −0.0021226 | 0.0032553 |
| B | −0.0001745 | 0.0011700 | 0.0034538 | 0.0044704 | −0.0000453 |
| C | 0.0000237 | −0.0013673 | −0.0019572 | −0.0021439 | −0.0030105 |
| D | −0.0000112 | 0.0006774 | 0.0006699 | 0.0001547 | 0.0016363 |
| E | 0.0000060 | −0.0001711 | −0.0001348 | 0.0001720 | −0.0002807 |
| F | −0.0000014 | 0.0000242 | 0.0000156 | −0.0000606 | −0.0000178 |
| G | 0.0000002 | −0.0000019 | −0.0000010 | 0.0000086 | 0.0000117 |
| H | 0.0000000 | 0.0000001 | 0.0000000 | −0.0000006 | −0.0000014 |
| J | 0.0000000 | 0.0000000 | 0.0000000 | 0.0000000 | 0.0000000 |

| Surface No. | S9 | S11 | S12 | S13 |
|---|---|---|---|---|
| K | −9.3148345 | 0.1447780 | 1.3173514 | 7.8764324 |
| A | 0.0096397 | −0.0160258 | −0.0044560 | −0.0023747 |
| B | −0.0135171 | 0.0213357 | 0.0072187 | 0.0026344 |
| C | 0.0035331 | −0.0173088 | −0.0076155 | −0.0031682 |
| D | 0.0029111 | 0.0044094 | 0.0044084 | 0.0018916 |
| E | −0.0025368 | 0.0015443 | −0.0018633 | −0.0007301 |
| F | 0.0008642 | −0.0012083 | 0.0006778 | 0.0002085 |
| G | −0.0001573 | 0.0002733 | −0.0001817 | −0.0000433 |
| H | 0.0000153 | −0.0000228 | 0.0000280 | 0.0000055 |
| J | −0.0000006 | 0.0000002 | −0.0000018 | −0.0000003 |

Next, an optical imaging system according to a second example embodiment will be described with reference to FIG. 3.

An optical imaging system 200 may include an optical path folding element. For example, the optical imaging system 200 may include a prism P in the form of an optical path folding element. The prism P is disposed on the object side of the lens group. The prism P refracts or reflects a path of light incident on the optical imaging system 200.

The optical imaging system 200 may include a lens group including a plurality of lenses. For example, the optical imaging system may include a lens group including a first lens 210, a second lens 220, a third lens 230, a fourth lens 240, and a fifth lens 250.

The first lens 210 has positive refractive power and has a convex object-side surface and a convex image-side surface. The second lens 220 has negative refractive power and has a convex object-side surface and a concave image-side surface. The third lens 230 has positive refractive power and has a convex object-side surface and a convex image-side surface. The fourth lens 240 has negative refractive power and has a concave object-side surface and a concave image-side surface. The fifth lens 250 has positive refractive power and has a convex object-side surface and a convex image-side surface.

In the present embodiment, a plurality of lenses disposed close to the imaging plane may have a larger refractive index than other lenses. For example, refractive indices of the fourth and fifth lenses 240 and 250 may be greater than refractive indices of the first to third lenses 210 to 230. To further explain, the refractive indices of the fourth and fifth lenses 240 and 250 are greater than 1.6 and less than 1.7, and the refractive indices of the first to third lenses 210 to 230 are greater than 1.5 and less than 1.6.

The optical imaging system 200 may further include a filter IF and an imaging plane IP.

The filter IF may be disposed on the image side of the lens group to block inflow of foreign substances or incidence of infrared rays. The imaging plane IP may provide a space in which light refracted by the first to fifth lenses 210 to 250 is imaged. The imaging plane IP may be formed on the image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

Figure 4:
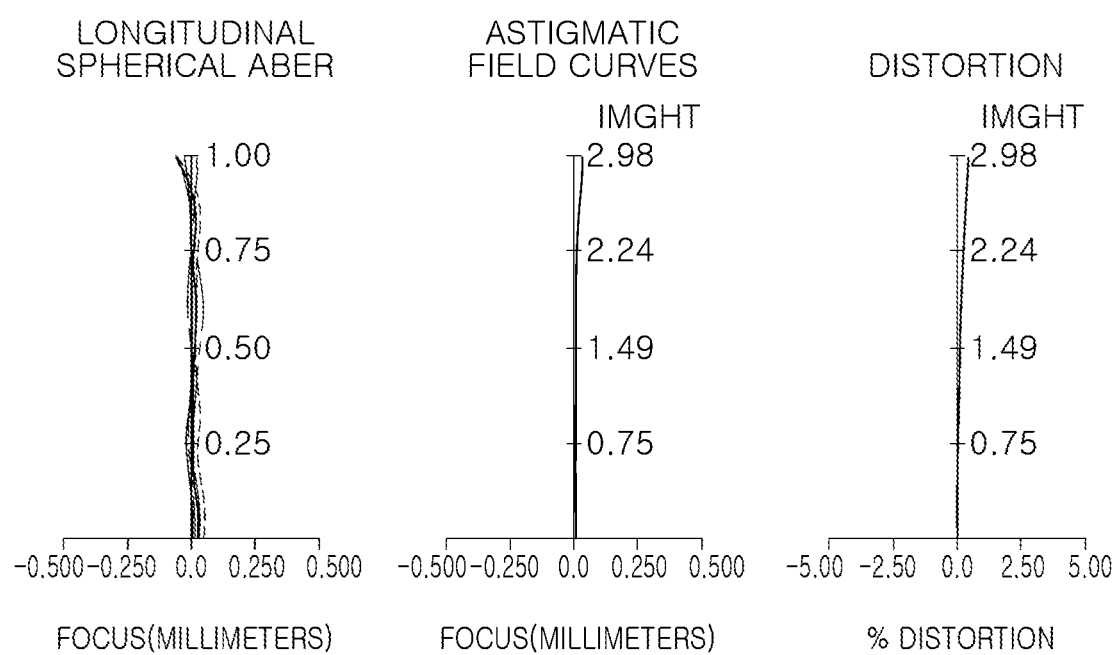
FIG. 4 includes graphs representing aberration curves of the optical imaging system illustrated in FIG. 3.

Table 3 illustrates the lens characteristics of the optical imaging system according to the present embodiment, and Table 4 illustrates aspherical values of the optical imaging system according to the present embodiment. FIG. 4 is a view of aberration curves of an optical imaging system according to the present embodiment.

TABLE 3

| Surface No. | Component | Curvature radius | Thickness/ distance | Refractive index | Abbe's number |
|---|---|---|---|---|---|
| S1 | Prism | Infinity | 2.500 | 1.717 | 29.50 |
| S2 | | Infinity | 2.500 | 1.717 | 29.50 |
| S3 | | Infinity | 2.000 | | |
| S4 | First lens | 6.234 | 2.150 | 1.535 | 56.00 |
| S5 | | −25.325 | 0.050 | | |
| S6 | Second lens | 102.939 | 1.200 | 1.535 | 56.00 |
| S7 | | 12.948 | 0.885 | | |
| S8 | Third lens | 36.12905 | 1.520 | 1.535 | 56.00 |
| S9 | | −8.84796 | 0.250 | | |
| S10 | Fourth lens | −7.63666 | 0.950 | 1.639 | 23.50 |
| S11 | | 3.00000 | 0.796 | | |
| S12 | Fifth lens | 6.98787 | 1.200 | 1.671 | 19.20 |
| S13 | | −19.61498 | 15.400 | | |
| S14 | Filter | Infinity | 0.110 | 1.516 | 64.10 |
| S15 | | Infinity | 2.500 | | |
| S16 | Imaging plane | Infinity | −0.010 | | |

TABLE 4

| Surface No. | S4 | S5 | S6 | S7 | S8 |
|---|---|---|---|---|---|
| K | −0.3899915 | −15.8425256 | 97.7317978 | 6.6170900 | 17.1169125 |
| A | 0.0008360 | −0.0010928 | −0.0050749 | −0.0035185 | 0.0030602 |
| B | −0.0003800 | 0.0017361 | 0.0058582 | 0.0081106 | 0.0004079 |
| C | 0.0001462 | −0.0016527 | −0.0037975 | −0.0061545 | −0.0047846 |
| D | −0.0000473 | 0.0007387 | 0.0014309 | 0.0025293 | 0.0035122 |
| E | 0.0000114 | −0.0001785 | −0.0003273 | −0.0006439 | −0.0012053 |
| F | −0.0000017 | 0.0000251 | 0.0000461 | 0.0001065 | 0.0002304 |
| G | 0.0000002 | −0.0000021 | −0.0000039 | −0.0000115 | −0.0000253 |
| H | 0.0000000 | 0.0000001 | 0.0000002 | 0.0000007 | 0.0000015 |
| J | 0.0000000 | 0.0000000 | 0.0000000 | 0.0000000 | 0.0000000 |
| Surface No. | S9 | S10 | S11 | S12 | S13 |
| K | −15.4638244 | −7.4511406 | 0.1223685 | 0.0198966 | 4.3154869 |
| A | 0.0108399 | 0.0011740 | −0.0174382 | −0.0057935 | −0.0027680 |
| B | −0.0189659 | −0.0002710 | 0.0302816 | 0.0108883 | 0.0039962 |
| C | 0.0104610 | −0.0000871 | −0.0312791 | −0.0120985 | −0.0051733 |
| D | −0.0018582 | 0.0000145 | 0.0167827 | 0.0079214 | 0.0037355 |
| E | −0.0005072 | 0.0000000 | −0.0055491 | −0.0037052 | −0.0018107 |
| F | 0.0003105 | 0.0000000 | 0.0014133 | 0.0012978 | 0.0006062 |
| G | −0.0000622 | 0.0000000 | −0.0003247 | −0.0003075 | −0.0001314 |
| H | 0.0000058 | 0.0000000 | 0.0000534 | 0.0000417 | 0.0000162 |
| J | −0.0000002 | 0.0000000 | −0.0000039 | −0.0000024 | −0.0000009 |

Figure 5:
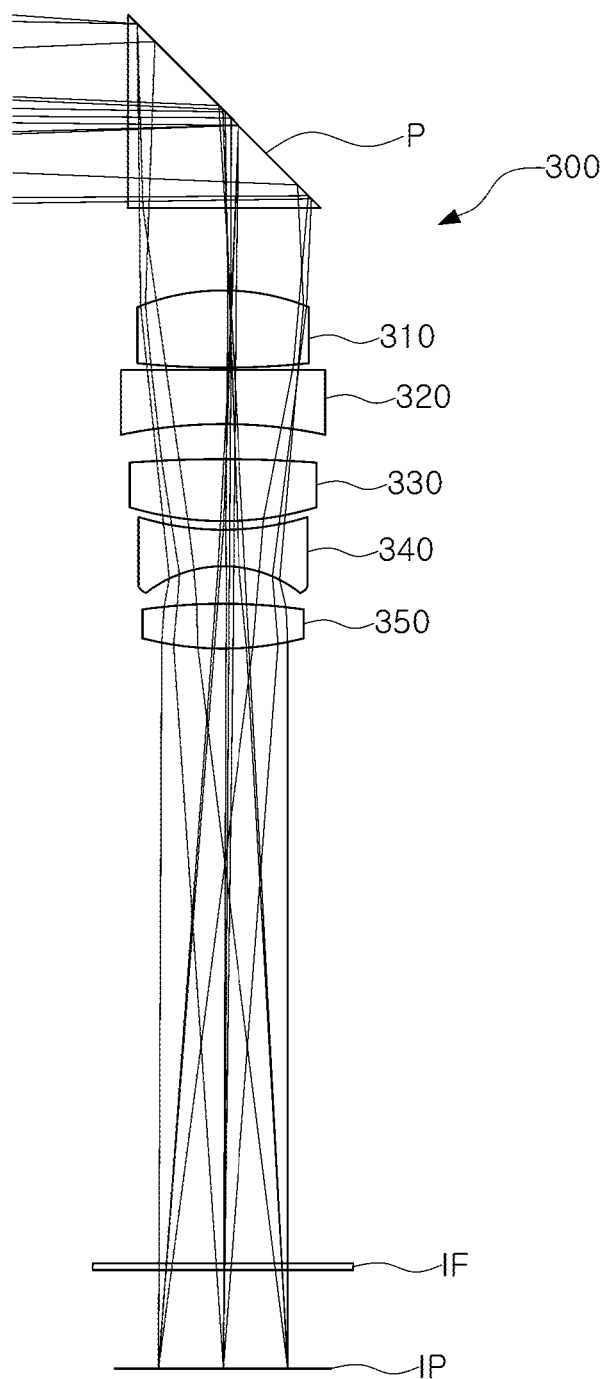
FIG. 5 is a view illustrating a configuration of an optical imaging system according to a third embodiment.

Next, an optical imaging system according to a third example embodiment will be described with reference to FIG. 5.

An optical imaging system 300 may include an optical path folding element. For example, the optical imaging system 300 may include a prism P in the form of an optical path folding element. The prism P is disposed on the object side of the lens group. The prism P refracts or reflects a path of light incident on the optical imaging system 300.

The optical imaging system 300 may include a lens group including a plurality of lenses. For example, the optical imaging system may include a lens group including a first lens 310, a second lens 320, a third lens 330, a fourth lens 340, and a fifth lens 350.

The first lens 310 has positive refractive power and has a convex object-side surface and a convex image-side surface. The second lens 320 has negative refractive power and has a concave object-side surface and a concave image-side surface. The third lens 330 has positive refractive power and has a convex object-side surface and a convex image-side surface. The fourth lens 340 has negative refractive power and has a concave object-side surface and a concave image-side surface. The fifth lens 350 has positive refractive power and has a convex object-side surface and a convex image-side surface.

In the present embodiment, a plurality of lenses disposed close to the imaging plane may have a larger refractive index than other lenses. For example, refractive indices of the fourth and fifth lenses 340 and 350 may be greater than refractive indices of the first to third lenses 310 to 330. To further explain, the refractive indices of the fourth and fifth lenses 340 and 350 are greater than 1.6 and less than 1.7, and the refractive indices of the first to third lenses 310 to 330 are greater than 1.5 and less than 1.6.

The optical imaging system 300 may further include a filter IF and an imaging plane IP.

The filter IF may be disposed on the image side of the lens group to block inflow of foreign substances or incidence of infrared rays. The imaging plane IP may provide a space in which light refracted by the first to fifth lenses 310 to 350 is imaged. The imaging plane IP may be formed on the image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

Figure 6:
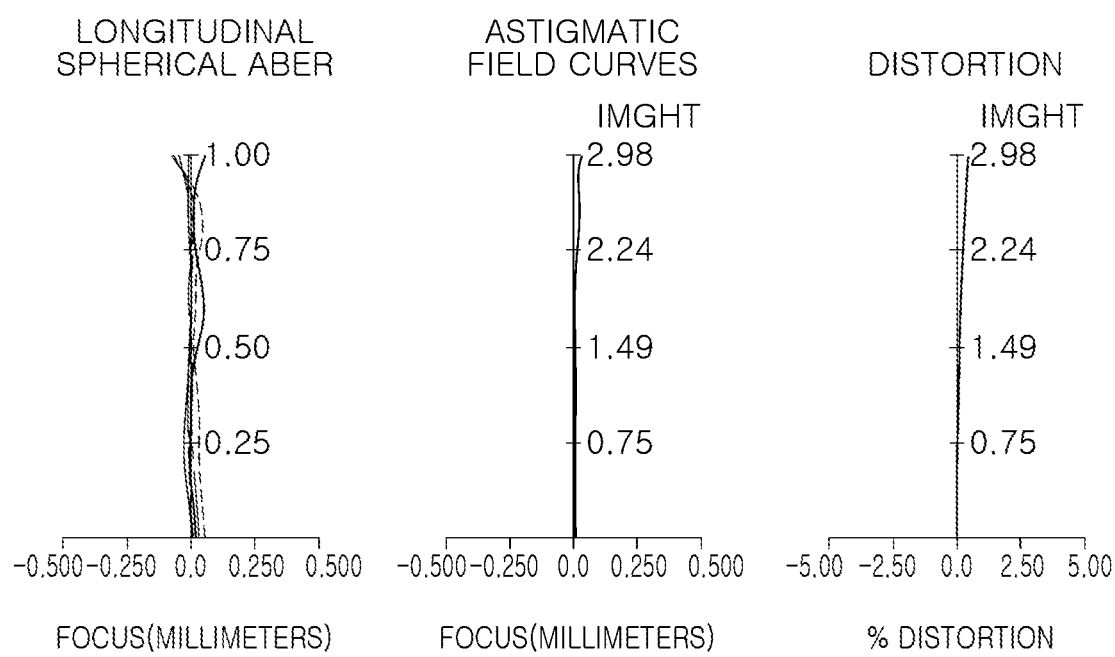
FIG. 6 includes graphs representing aberration curves of the optical imaging system illustrated in FIG. 5.

Table 5 illustrates the lens characteristics of the optical imaging system according to the present embodiment, and Table 6 illustrates aspherical values of the optical imaging system according to the present embodiment. FIG. 6 is a view of aberration curves of an optical imaging system according to the present embodiment.

TABLE 5

| Surface No. | Component | Curvature radius | Thickness/ distance | Refractive index | Abbe's number |
|---|---|---|---|---|---|
| S1 | Prism | Infinity | 2.500 | 1.717 | 29.50 |
| S2 |  | Infinity | 2.500 | 1.717 | 29.50 |
| S3 |  | Infinity | 2.000 |  |  |
| S4 | First lens | 5.844 | 2.100 | 1.535 | 56.00 |
| S5 |  | −18.740 | 0.050 |  |  |
| S6 | Second lens | −47.695 | 1.200 | 1.535 | 56.00 |
| S7 |  | 12.233 | 0.922 |  |  |
| S8 | Third lens | 19.80415 | 1.550 | 1.535 | 56.00 |
| S9 |  | −11.62647 | 0.205 |  |  |
| S10 | Fourth lens | −10.05860 | 0.950 | 1.639 | 23.50 |
| S11 |  | 3.00000 | 0.912 |  |  |
| S12 | Fifth lens | 11.85790 | 1.113 | 1.671 | 19.20 |
| S13 |  | −11.24300 | 15.400 |  |  |
| S14 | Filter | Infinity | 0.110 | 1.516 | 64.10 |
| S15 |  | Infinity | 2.500 |  |  |
| S16 | Imaging plane | Infinity | −0.010 |  |  |

TABLE 6

| Surface No. | S4 | S5 | S6 | S7 | S8 |
|---|---|---|---|---|---|
| K | −0.1983755 | −0.6751177 | 99.0000000 | 10.5144840 | −12.2519110 |
| A | 0.0004866 | 0.0013360 | −0.0003180 | −0.0023888 | −0.0032873 |
| B | −0.0000056 | −0.0018273 | −0.0008272 | 0.0055926 | 0.0085521 |
| C | 0.0000099 | 0.0004546 | 0.0002744 | −0.0032140 | −0.0088427 |
| D | −0.0000219 | 0.0000887 | 0.0000496 | 0.0007519 | 0.0040999 |
| E | 0.0000099 | −0.0000653 | −0.0000463 | −0.0000471 | −0.0009879 |
| F | −0.0000020 | 0.0000136 | 0.0000109 | −0.0000062 | 0.0001290 |
| G | 0.0000002 | −0.0000014 | −0.0000013 | 0.0000000 | −0.0000099 |
| H | 0.0000000 | 0.0000001 | 0.0000001 | 0.0000002 | 0.0000006 |
| J | 0.0000000 | 0.0000000 | 0.0000000 | 0.0000000 | 0.0000000 |

| Surface No. | S9 | S10 | S11 | S12 | S13 |
|---|---|---|---|---|---|
| K | 2.9747325 | −0.0046896 | 0.1840384 | −5.5371295 | 15.7893436 |
| A | −0.0012857 | 0.0001374 | −0.0084298 | −0.0052193 | −0.0034328 |
| B | 0.0041032 | −0.0004159 | 0.0071302 | 0.0072981 | 0.0037173 |
| C | −0.0115654 | −0.0001078 | −0.0038865 | −0.0095994 | −0.0049815 |
| D | 0.0103349 | 0.0000047 | −0.0014598 | 0.0075530 | 0.0036778 |
| E | −0.0047427 | 0.0000000 | 0.0015080 | −0.0043356 | −0.0018276 |
| F | 0.0012486 | 0.0000000 | −0.0000079 | 0.0018110 | 0.0006359 |
| G | −0.0001920 | 0.0000000 | −0.0002557 | −0.0004840 | −0.0001438 |
| H | 0.0000162 | 0.0000000 | 0.0000759 | 0.0000713 | 0.0000185 |
| J | −0.0000006 | 0.0000000 | −0.0000068 | −0.0000044 | −0.0000010 |

Figure 7:
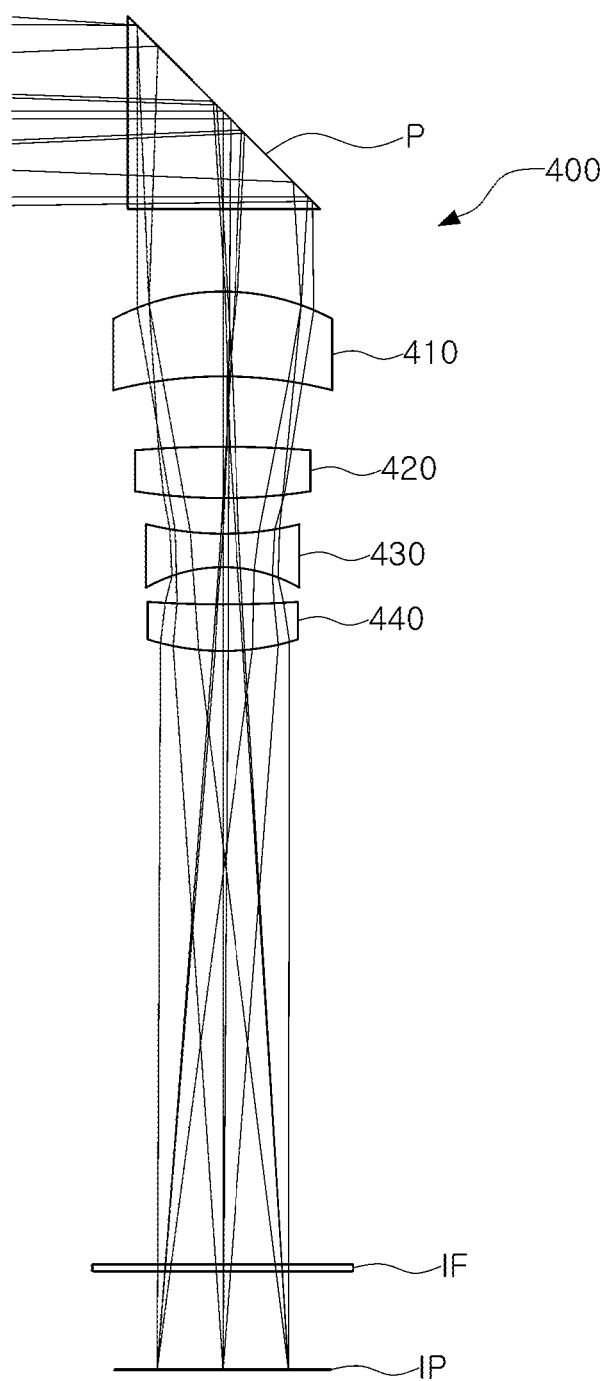
FIG. 7 is a view illustrating a configuration of an optical imaging system according to a fourth embodiment.

Next, an optical imaging system according to a fourth example embodiment will be described with reference to FIG. 7.

An optical imaging system 400 may include an optical path folding element. For example, the optical imaging system 400 may include a prism P in the form of an optical path folding element. The prism P is disposed on the object side of the lens group. The prism P refracts or reflects a path of light incident on the optical imaging system 400.

The optical imaging system 400 may include a lens group including a plurality of lenses. For example, the optical imaging system may include a lens group including a first lens 410, a second lens 420, a third lens 430, and a fourth lens 440.

The first lens 410 has positive refractive power and has a convex object-side surface and a concave image-side surface. The second lens 420 has positive refractive power and has a convex object-side surface and a convex image-side surface. The third lens 430 has negative refractive power and has a concave object-side surface and a concave image-side surface. The fourth lens 440 has positive refractive power and has a convex object-side surface and a convex image-side surface.

In the present embodiment, a plurality of lenses disposed close to the imaging plane may have a higher refractive index than other lenses. For example, refractive indices of the third and fourth lenses 430 and 440 may be greater than refractive indices of the first and second lenses 410 and 420. To further explain, the refractive indices of the third and fourth lenses 430 and 440 are greater than 1.6 and less than 1.7, and the refractive indices of the first and second lenses 410 and 420 are greater than 1.5 and less than 1.6.

The optical imaging system 400 may further include a filter IF and an imaging plane IP.

The filter IF may be disposed on the image side of the lens group to block inflow of foreign substances or incidence of infrared rays. The imaging plane IP may provide a space in which light refracted by the first to fourth lenses 410 to 440 is imaged. The imaging plane IP may be formed on the image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

Figure 8:
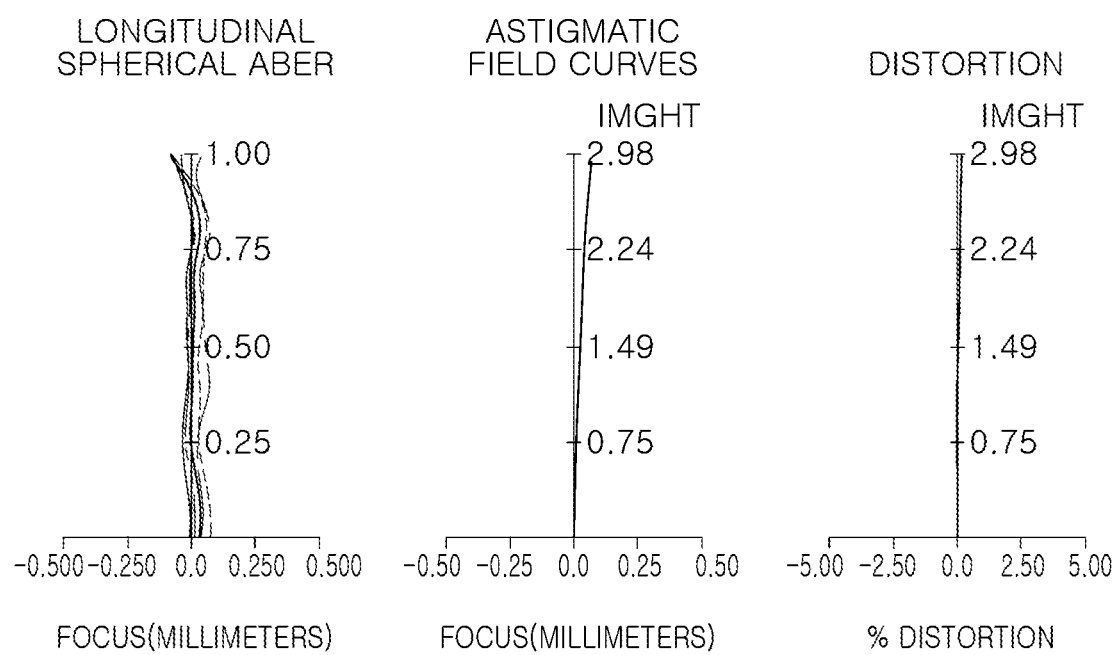
FIG. 8 includes graphs representing aberration curves of the optical imaging system illustrated in FIG. 7.

Table 7 illustrates the lens characteristics of the optical imaging system according to the present embodiment, and Table 8 illustrates aspherical values of the optical imaging system according to the present embodiment. FIG. 8 is a view of aberration curves of an optical imaging system according to the present embodiment.

TABLE 7

| Surface No. | Component | Curvature radius | Thickness/ distance | Refractive index | Abbe's number |
|---|---|---|---|---|---|
| S1 | Prism | Infinity | 2.500 | 1.717 | 29.50 |
| S2 | | Infinity | 2.500 | 1.717 | 29.50 |
| S3 | | Infinity | 2.000 | | |
| S4 | First lens | 5.998 | 2.150 | 1.535 | 56.00 |
| S5 | | 24.862 | 1.769 | | |
| S6 | Second lens | 18.373 | 1.200 | 1.535 | 56.00 |
| S7 | | −18.748 | 0.976 | | |
| S8 | Third lens | −8.34875 | 0.790 | 1.651 | 21.50 |
| S9 | | 3.09790 | 0.917 | | |
| S10 | Fourth lens | 11.30923 | 1.200 | 1.671 | 19.20 |
| S11 | | −8.96276 | 15.400 | | |
| S12 | Filter | Infinity | 0.110 | 1.516 | 64.10 |
| S13 | | Infinity | 2.501 | | |
| S14 | Imaging plane | Infinity | −0.010 | | |

TABLE 8

| Surface No. | S4 | S5 | S6 | S7 |
|---|---|---|---|---|
| K | −0.0229951 | 35.5770814 | 43.4531238 | 4.0884351 |
| A | −0.0004204 | −0.0025259 | −0.0111783 | −0.0104149 |
| B | 0.0005098 | 0.0032171 | 0.0163381 | 0.0246777 |
| C | −0.0001506 | −0.0012676 | −0.0082388 | −0.0151025 |
| D | 0.0000378 | 0.0003836 | 0.0024305 | 0.0041260 |
| E | −0.0000062 | −0.0000866 | −0.0005199 | −0.0004357 |
| F | 0.0000006 | 0.0000131 | 0.0000844 | −0.0000377 |
| G | 0.0000000 | −0.0000012 | −0.0000093 | 0.0000159 |
| H | 0.0000000 | 0.0000001 | 0.0000006 | −0.0000018 |
| J | 0.0000000 | 0.0000000 | 0.0000000 | 0.0000001 |

| Surface No. | S9 | S10 | S11 |
|---|---|---|---|
| K | 0.6932688 | −1.9933803 | 14.6559826 |
| A | −0.0093419 | −0.0076155 | −0.0028684 |
| B | −0.0199206 | −0.0017746 | 0.0001855 |
| C | 0.0152648 | −0.0078999 | −0.0026515 |
| D | 0.0047067 | 0.0147892 | 0.0034261 |
| E | −0.0103126 | −0.0104502 | −0.0018602 |

TABLE 8-continued

| F | 0.0053311 | 0.0039924 | 0.0005308 |
|---|---|---|---|
| G | −0.0013674 | −0.0008928 | −0.0000823 |
| H | 0.0001813 | 0.0001120 | 0.0000064 |
| J | −0.0000101 | −0.0000062 | −0.0000002 |

Figure 9:
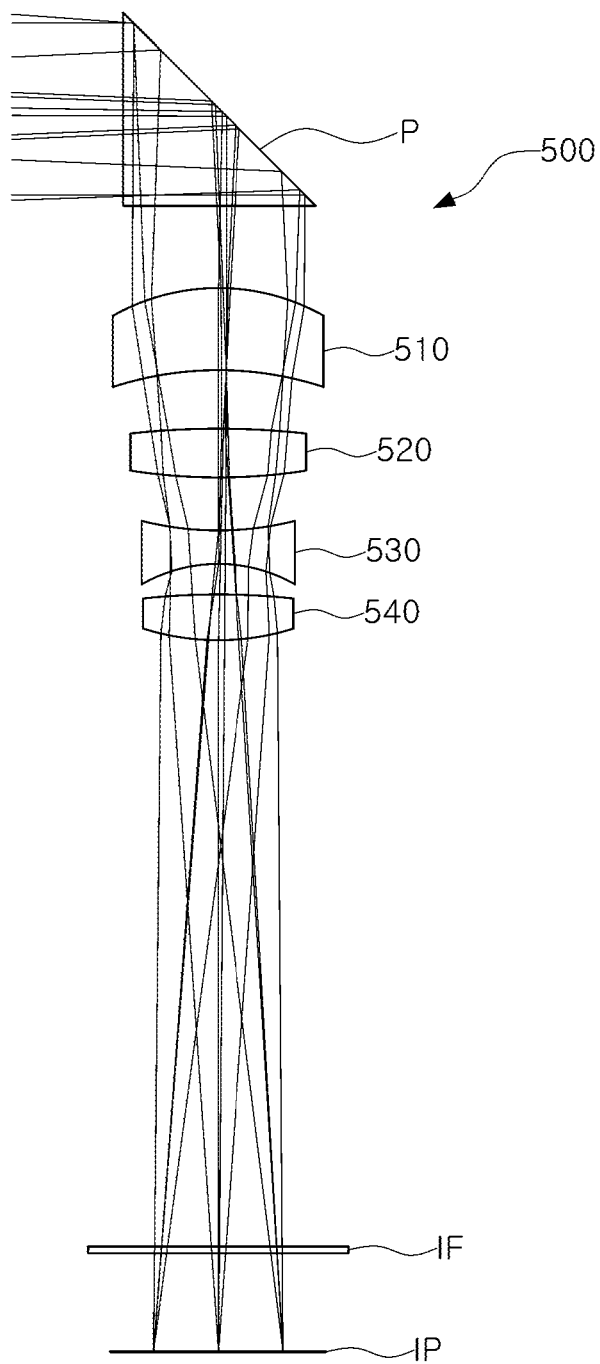
FIG. 9 is a view illustrating a configuration of an optical imaging system according to a fifth embodiment.

Next, an optical imaging system according to a fifth example embodiment will be described with reference to FIG. 9.

An optical imaging system 500 may include an optical path folding element. For example, the optical imaging system 500 may include a prism P in the form of an optical path folding element. The prism P is disposed on the object side of the lens group. The prism P refracts or reflects a path of light incident on the optical imaging system 500.

The optical imaging system 500 may include a lens group including a plurality of lenses. For example, the optical imaging system may include a lens group including a first lens 510, a second lens 520, a third lens 530, and a fourth lens 540.

The first lens 510 has positive refractive power and has a convex object-side surface and a concave image-side surface. The second lens 520 has positive refractive power and has a convex object-side surface and a convex image-side surface. The third lens 530 has negative refractive power and has a concave object-side surface and a concave image-side surface. The fourth lens 540 has positive refractive power and has a convex object-side surface and a convex image-side surface.

In the present embodiment, a plurality of lenses disposed close to the imaging plane may have a larger refractive index than other lenses. For example, refractive indices of the third and fourth lenses 530 and 540 may be greater than refractive indices of the first and second lenses 510 and 520. To further explain, the refractive indices of the third and fourth lenses 530 and 540 are greater than 1.6 and less than 1.7, and the refractive indices of the first and second lenses 510 and 520 are greater than 1.5 and less than 1.6.

The optical imaging system 500 may further include a filter IF and an imaging plane IP.

The filter IF may be disposed on the image side of the lens group to block inflow of foreign substances or incidence of infrared rays. The imaging plane IP may provide a space in which light refracted by the first to fourth lenses 510 to 540 is imaged. The imaging plane IP may be formed on the image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

Figure 10:
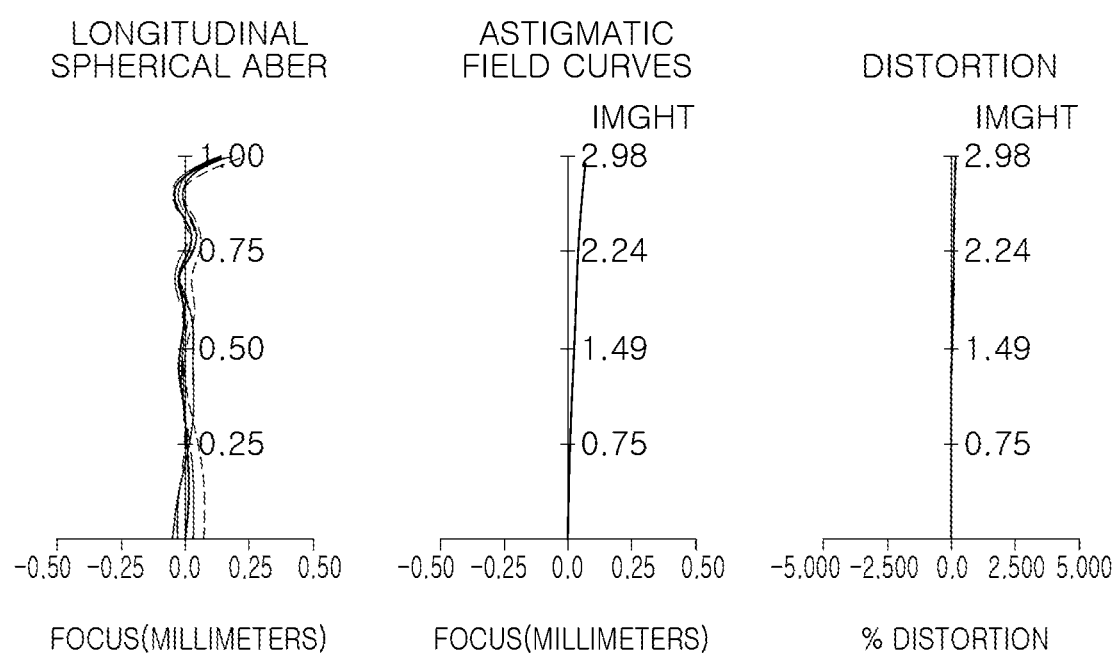
FIG. 10 includes graphs representing aberration curves of the optical imaging system illustrated in FIG. 9.

Table 9 illustrates the lens characteristics of the optical imaging system according to the present embodiment, and Table 10 illustrates aspherical values of the optical imaging system according to the present embodiment. FIG. 10 is a view of aberration curves of an optical imaging system according to the present embodiment.

TABLE 9

| Surface No. | Component | Curvature radius | Thickness/ distance | Refractive index | Abbe's number |
|---|---|---|---|---|---|
| S1 | Prism | Infinity | 2.500 | 1.717 | 29.50 |
| S2 | | Infinity | 2.500 | 1.717 | 29.50 |
| S3 | | Infinity | 2.000 | | |
| S4 | First lens | 5.793 | 2.150 | 1.535 | 56.00 |

TABLE 9-continued

| Surface No. | Component | Curvature radius | Thickness/ distance | Refractive index | Abbe's number |
|---|---|---|---|---|---|
| S5 | | 21.170 | 1.462 | | |
| S6 | Second lens | 26.596 | 1.200 | 1.535 | 56.00 |
| S7 | | −23.893 | 1.350 | | |
| S8 | Third lens | −8.07155 | 0.790 | 1.657 | 20.40 |
| S9 | | 3.18445 | 0.865 | | |
| S10 | Fourth lens | 7.51608 | 1.184 | 1.671 | 19.20 |
| S11 | | −11.00970 | 15.400 | | |
| S12 | Filter | Infinity | 0.110 | 1.516 | 64.10 |
| S13 | | Infinity | 2.500 | | |
| S14 | Imaging plane | Infinity | −0.010 | | |

TABLE 10

| Surface No. | S4 | S5 | S6 | S7 |
|---|---|---|---|---|
| K | 0.0739428 | 43.6118993 | 76.1758496 | 71.7642853 |
| A | 0.0001307 | −0.0004356 | −0.0020036 | 0.0032133 |
| B | 0.0003087 | 0.0012711 | 0.0007705 | −0.0027689 |
| C | −0.0001125 | −0.0004386 | 0.0010753 | 0.0030061 |
| D | 0.0000485 | 0.0002993 | −0.0005654 | −0.0021742 |
| E | −0.0000118 | −0.0001195 | 0.0000320 | 0.0007672 |
| F | 0.0000016 | 0.0000253 | 0.0000325 | −0.0001401 |
| G | −0.0000001 | −0.0000030 | −0.0000085 | 0.0000130 |
| H | 0.0000000 | 0.0000002 | 0.0000008 | −0.0000005 |
| J | 0.0000000 | 0.0000000 | 0.0000000 | 0.0000000 |

| Surface No. | S9 | S10 | S11 |
|---|---|---|---|
| K | 1.0795981 | −20.3577245 | 22.8229082 |
| A | −0.0418474 | −0.0268870 | −0.0124602 |
| B | 0.0280469 | 0.0114621 | 0.0021660 |
| C | −0.0217136 | −0.0058259 | 0.0019321 |
| D | 0.0192247 | 0.0053730 | −0.0026526 |
| E | −0.0109259 | −0.0029152 | 0.0019271 |
| F | 0.0032772 | 0.0008156 | −0.0008322 |
| G | −0.0004603 | −0.0001266 | 0.0002045 |
| H | 0.0000152 | 0.0000117 | −0.0000264 |
| J | 0.0000017 | −0.0000006 | 0.0000014 |

Figure 11:
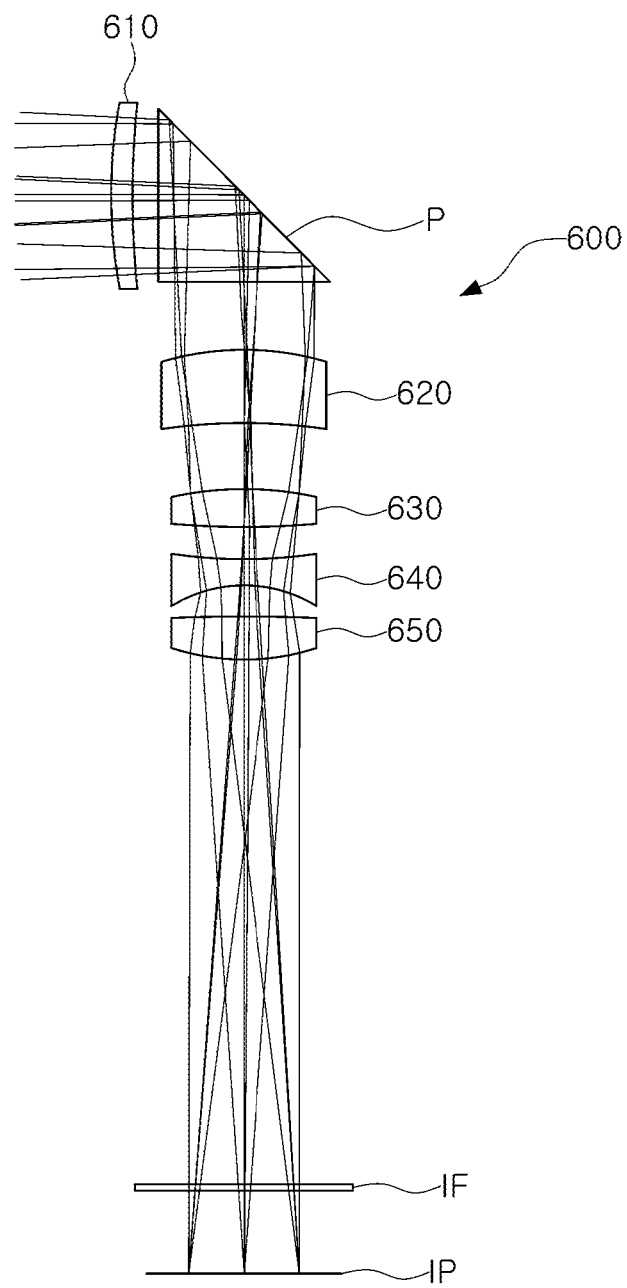
FIG. 11 is a view illustrating a configuration of an optical imaging system according to a sixth embodiment.

Next, an optical imaging system according to a sixth example embodiment will be described with reference to FIG. 11.

An optical imaging system 600 may include an optical path folding element. For example, the optical imaging system 600 may include a prism P in the form of an optical path folding element. The prism P is disposed between a first lens 610 and a second lens 620 configuring a lens group. The prism P refracts or reflects a path of light incident on the optical imaging system 600.

The optical imaging system 600 may include a lens group including a plurality of lenses. For example, the optical imaging system may include a lens group including the first lens 610, the second lens 620, a third lens 630, a fourth lens 640, and a fifth lens 650.

The first lens 610 has positive refractive power and has a convex object-side surface and a concave image-side surface. The second lens 620 has negative refractive power and has a convex object-side surface and a concave image-side surface. The third lens 630 has positive refractive power and has a convex object-side surface and a convex image-side surface. The fourth lens 640 has negative refractive power and has a concave object-side surface and a concave image-side surface. The fifth lens 650 has positive refractive power and has a convex object-side surface and a convex image-side surface.

In the present embodiment, a plurality of lenses disposed close to the imaging plane may have a larger refractive index than other lenses. For example, refractive indices of the fourth and fifth lenses 640 and 650 may be greater than refractive indices of the first to third lenses 610 to 630. To further explain, the refractive indices of the fourth and fifth lenses 640 and 650 are greater than 1.6 and less than 1.7, and the refractive indices of the first to third lenses 610 to 630 are greater than 1.5 and less than 1.6.

The optical imaging system 600 may further include a filter IF and an imaging plane IP.

The filter IF may be disposed on the image side of the lens group to block inflow of foreign substances or incidence of infrared rays. The imaging plane IP may provide a space in which light refracted by the first to fifth lenses 610 to 650 is imaged. The imaging plane IP may be formed on the image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

Figure 12:
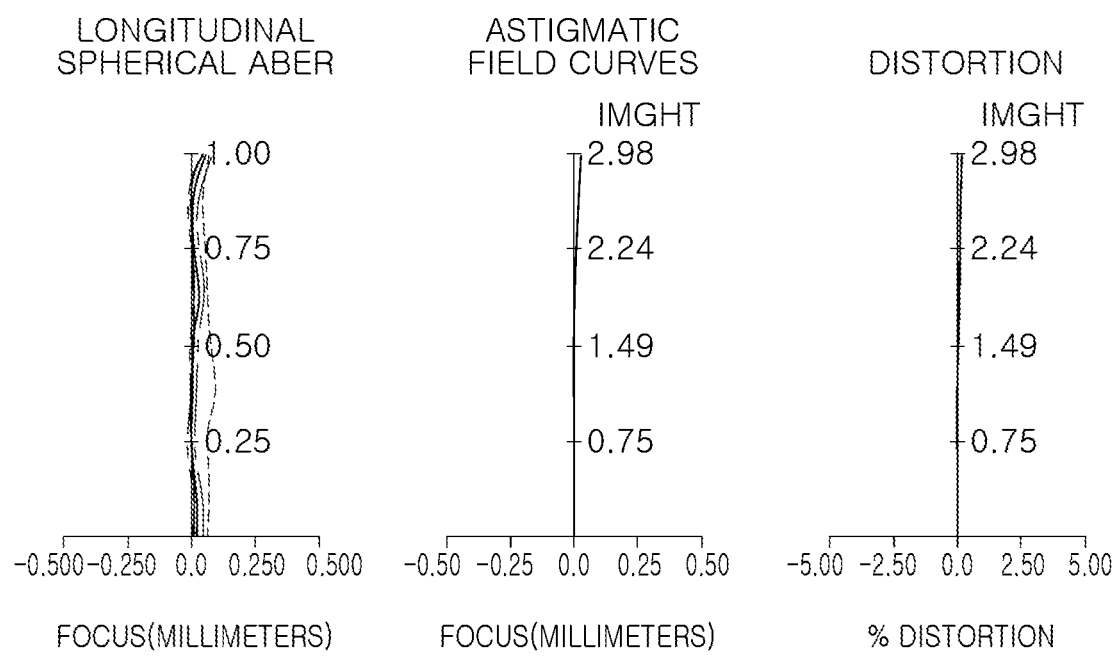
FIG. 12 includes graphs representing aberration curves of the optical imaging system illustrated in FIG. 11.

Table 11 illustrates the lens characteristics of the optical imaging system according to the present embodiment, and Table 12 illustrates aspherical values of the optical imaging system according to the present embodiment. FIG. 12 is a view of aberration curves of an optical imaging system according to the present embodiment.

TABLE 11

| Surface No. | Component | Curvature radius | Thickness/ distance | Refractive index | Abbe's number |
|---|---|---|---|---|---|
| S1 | First lens | 16.90317 | 0.650 | 1.535 | 56.00 |
| S2 | | 23.07441 | 0.750 | | |
| S3 | Prism | Infinity | 2.500 | 1.717 | 29.50 |
| S4 | | Infinity | 2.500 | 1.717 | 29.50 |
| S5 | | Infinity | 2.000 | | |
| S6 | Second lens | 8.582 | 2.150 | 1.535 | 56.00 |
| S7 | | 56.115 | 1.812 | | |
| S8 | Third lens | 15.94482 | 1.194 | 1.535 | 56.00 |
| S9 | | −18.16351 | 0.917 | | |
| S10 | Fourth lens | −12.88447 | 0.790 | 1.651 | 21.50 |
| S11 | | 3.00758 | 0.936 | | |
| S12 | Fifth lens | 12.43782 | 1.200 | 1.671 | 19.20 |
| S13 | | −9.02523 | 15.400 | | |
| S14 | Filter | Infinity | 0.110 | 1.516 | 64.10 |
| S15 | | Infinity | 2.492 | | |
| S16 | Imaging plane | Infinity | −0.001 | | |

TABLE 12

| Surface No. | S1 | S2 | S6 | S7 | S8 |
|---|---|---|---|---|---|
| K | 0.0000000 | 0.0000000 | 0.2397594 | 99.0000000 | 31.3735938 |
| A | −0.0000193 | 0.0000091 | −0.0003347 | −0.0020510 | −0.0111321 |
| B | 0.0000004 | −0.0000009 | 0.0005286 | 0.0031970 | 0.0163800 |
| C | −0.0000001 | 0.0000001 | −0.0001544 | −0.0012659 | −0.0082269 |
| D | 0.0000000 | 0.0000000 | 0.0000378 | 0.0003834 | 0.0024320 |
| E | 0.0000000 | 0.0000000 | −0.0000062 | −0.0000867 | −0.0005200 |
| F | 0.0000000 | 0.0000000 | 0.0000006 | 0.0000131 | 0.0000843 |

TABLE 12-continued

| | | | | | |
|---|---|---|---|---|---|
| G | 0.0000000 | 0.0000000 | 0.0000000 | −0.0000012 | −0.0000093 |
| H | 0.0000000 | 0.0000000 | 0.0000000 | 0.0000001 | 0.0000006 |
| J | 0.0000000 | 0.0000000 | 0.0000000 | 0.0000000 | 0.0000000 |

| Surface No. | S9 | S11 | S12 | S13 |
|---|---|---|---|---|
| K | −10.1791898 | 0.8890140 | −2.0160482 | 14.6559826 |
| A | −0.0101222 | −0.0117796 | −0.0076410 | −0.0028684 |
| B | 0.0248352 | −0.0207864 | −0.0018569 | 0.0001855 |
| C | −0.0150874 | 0.0153005 | −0.0078616 | −0.0026515 |
| D | 0.0041256 | 0.0047032 | 0.0147755 | 0.0034261 |
| E | −0.0004361 | −0.0103175 | −0.0104531 | −0.0018602 |
| F | −0.0000378 | 0.0053312 | 0.0039935 | 0.0005308 |
| G | 0.0000159 | −0.0013674 | −0.0008928 | −0.0000823 |
| H | −0.0000018 | 0.0001813 | 0.0001120 | 0.0000064 |
| J | 0.0000001 | −0.0000101 | −0.0000062 | −0.0000002 |

Figure 13:
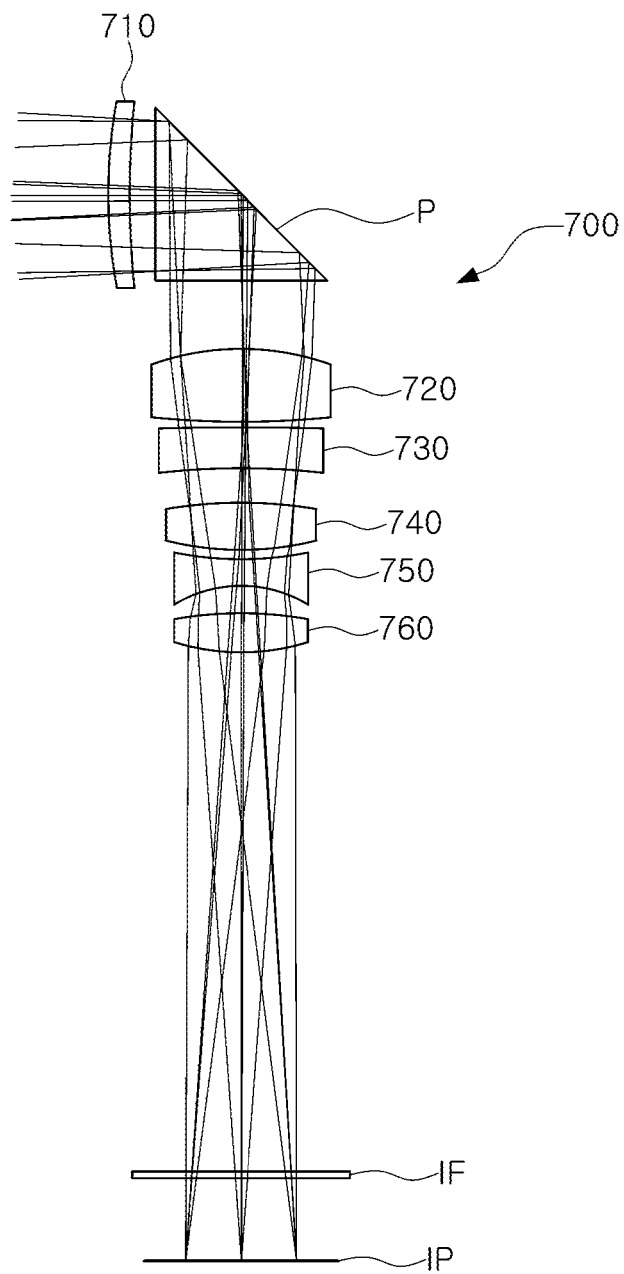
FIG. 13 is a view illustrating a configuration of an optical imaging system according to a seventh embodiment.

Next, an optical imaging system according to a seventh example embodiment will be described with reference to FIG. 13.

An optical imaging system 700 may include an optical path folding element. For example, the optical imaging system 700 may include a prism P in the form of an optical path folding element. The prism P is disposed between a first lens 710 and a second lens 720 configuring a lens group. The prism P refracts or reflects a path of light incident on the optical imaging system 700.

The optical imaging system 700 may include a lens group including a plurality of lenses. For example, the optical imaging system may include a lens group including the first lens 710, the second lens 720, a third lens 730, a fourth lens 740, a fifth lens 750, and a sixth lens 760.

The first lens 710 has positive refractive power and has a convex object-side surface and a concave image-side surface. The second lens 720 has positive refractive power and has a convex object-side surface and a convex image-side surface. The third lens 730 has negative refractive power and has a concave object-side surface and a concave image-side surface. The fourth lens 740 has positive refractive power and has a convex object-side surface and a convex image-side surface. The fifth lens 750 has negative refractive power and has a concave object-side surface and a concave image-side surface. The sixth lens 760 has positive refractive power and has a convex object-side surface and a convex image-side surface.

In the present embodiment, a plurality of lenses disposed close to the imaging plane may have a larger refractive index than other lenses. For example, refractive indices of the fifth and sixth lenses 750 and 760 may be greater than refractive indices of the first to fourth lenses 710 to 740. To further explain, the refractive indices of the fifth and sixth lenses 750 and 760 are greater than 1.6 and less than 1.7, and the refractive indices of the first to fourth lenses 710 to 740 are greater than 1.5 and less than 1.6.

The optical imaging system 700 may further include a filter IF and an imaging plane IP.

The filter IF may be disposed on the image side of the lens group to block inflow of foreign substances or incidence of infrared rays. The imaging plane IP may provide a space in which light refracted by the first to sixth lenses 710 to 760 is imaged. The imaging plane IP may be formed on the image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

Figure 14:
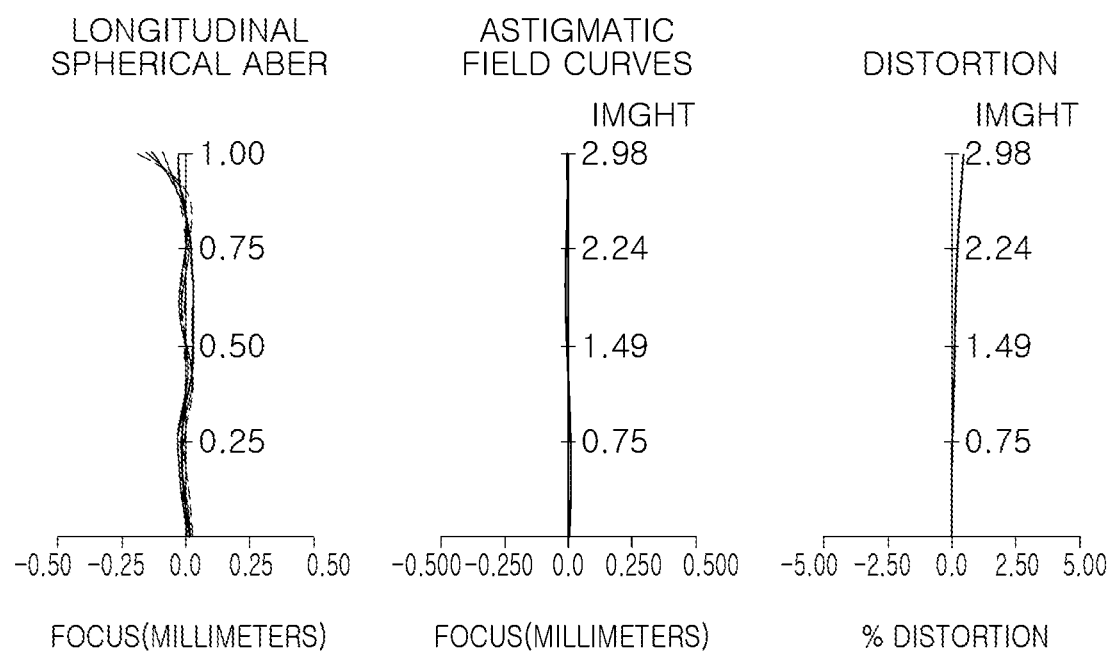
FIG. 14 includes graphs representing aberration curves of the optical imaging system illustrated in FIG. 13.

Table 13 illustrates the lens characteristics of the optical imaging system according to the present embodiment, and Table 14 illustrates aspherical values of the optical imaging system according to the present embodiment. FIG. 14 is a view of aberration curves of an optical imaging system according to the present embodiment.

TABLE 13

| Surface No. | Component | Curvature radius | Thickness/ distance | Refractive index | Abbe's number |
|---|---|---|---|---|---|
| S1 | First lens | 12.04703 | 0.650 | 1.535 | 56.00 |
| S2 | | 14.73446 | 0.850 | | |
| S3 | Prism | Infinity | 2.500 | 1.717 | 29.50 |
| S4 | | Infinity | 2.500 | 1.717 | 29.50 |
| S5 | | Infinity | 2.000 | | |
| S6 | Second lens | 7.951 | 2.150 | 1.535 | 56.00 |
| S7 | | −41.003 | 0.162 | | |
| S8 | Third lens | −3065.73473 | 1.200 | 1.535 | 56.00 |
| S9 | | 16.23890 | 1.010 | | |
| S10 | Fourth lens | 13.89670 | 1.439 | 1.535 | 56.00 |
| S11 | | −9.61561 | 0.276 | | |
| S12 | Fifth lens | −7.85838 | 0.772 | 1.639 | 23.50 |
| S13 | | 3.19901 | 0.856 | | |
| S14 | Sixth lens | 11.45246 | 1.135 | 1.671 | 19.20 |
| S15 | | −10.47007 | 15.400 | | |
| S16 | Filter | Infinity | 0.110 | 1.516 | 64.10 |
| S17 | | Infinity | 2.500 | | |
| S18 | Imaging plane | Infinity | −0.010 | | |

TABLE 14

| Surface No. | S1 | S2 | S6 | S7 | S8 | S9 |
|---|---|---|---|---|---|---|
| K | 0.0000000 | 0.0000000 | −0.3987184 | −34.1681756 | 99.0000000 | 6.4281032 |
| A | −0.0000107 | 0.0000069 | 0.0006990 | −0.0007683 | −0.0039440 | −0.0021265 |
| B | 0.0000002 | −0.0000005 | −0.0001731 | 0.0011692 | 0.0034563 | 0.0044887 |
| C | −0.0000001 | 0.0000000 | 0.0000236 | −0.0013675 | −0.0019565 | −0.0021408 |
| D | 0.0000000 | 0.0000000 | −0.0000112 | 0.0006773 | 0.0006700 | 0.0001551 |
| E | 0.0000000 | 0.0000000 | 0.0000060 | −0.0001711 | −0.0001348 | 0.0001721 |
| F | 0.0000000 | 0.0000000 | −0.0000014 | 0.0000242 | 0.0000156 | −0.0000606 |

TABLE 14-continued

| | | | | | | |
|---|---|---|---|---|---|---|
| G | 0.0000000 | 0.0000000 | 0.0000002 | −0.0000019 | −0.0000010 | 0.0000086 |
| H | 0.0000000 | 0.0000000 | 0.0000000 | 0.0000001 | 0.0000000 | −0.0000006 |
| J | 0.0000000 | 0.0000000 | 0.0000000 | 0.0000000 | 0.0000000 | 0.0000000 |

| Surface No. | S10 | S11 | S12 | S13 | S14 |
|---|---|---|---|---|---|
| K | 13.2060099 | −13.9732204 | 0.1378868 | 0.9224880 | 7.1234170 |
| A | 0.0032022 | 0.0099158 | −0.0159934 | −0.0045002 | −0.0023253 |
| B | −0.0000601 | −0.0135282 | 0.0212655 | 0.0071133 | 0.0026784 |
| C | −0.0030114 | 0.0035278 | −0.0173349 | −0.0076216 | −0.0031810 |
| D | 0.0016364 | 0.0029114 | 0.0044173 | 0.0044048 | 0.0018866 |
| E | −0.0002806 | −0.0025368 | 0.0015478 | −0.0018651 | −0.0007304 |
| F | −0.0000177 | 0.0008641 | −0.0012085 | 0.0006778 | 0.0002086 |
| G | 0.0000117 | −0.0001573 | 0.0002733 | −0.0001817 | −0.0000433 |
| H | −0.0000014 | 0.0000153 | −0.0000228 | 0.0000280 | 0.0000055 |
| J | 0.0000000 | −0.0000006 | 0.0000002 | −0.0000018 | −0.0000003 |

Figure 15:
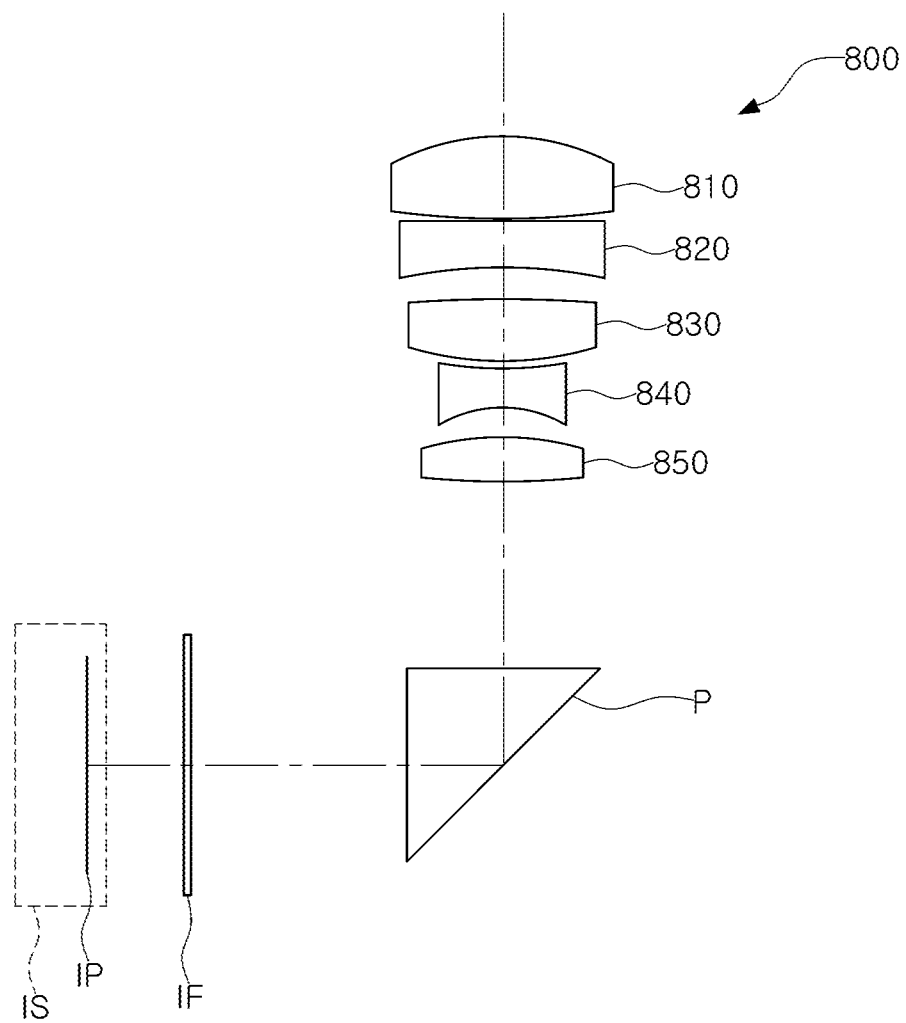
FIG. 15 is a view illustrating a configuration of an optical imaging system according to an eighth embodiment.

Next, an optical imaging system according to an eighth example embodiment will be described with reference to FIG. 15.

An optical imaging system 800 according to the present embodiment may include an optical path folding element. For example, the optical imaging system 800 may include a prism P in the form of an optical path folding element. The prism P is disposed on an image side of a lens group. The prism P refracts or reflects a path of light exiting from the lens group toward an imaging plane IP.

The optical imaging system 800 may include a lens group including a plurality of lenses. For example, the optical imaging system may include a lens group including a first lens 810, a second lens 820, a third lens 830, a fourth lens 840, and a fifth lens 850.

The first lens 810 has positive refractive power and has a convex object-side surface and a convex image-side surface. The second lens 820 has negative refractive power and has a convex object-side surface and a concave image-side surface. The third lens 830 has positive refractive power and has a convex object-side surface and a convex image-side surface. The fourth lens 840 has negative refractive power and has a concave object-side surface and a concave image-side surface. The fifth lens 850 has positive refractive power and has a convex object-side surface and a convex image-side surface.

The optical imaging system 800 may further include a filter IF and an imaging plane IP.

The filter IF may be disposed on the image side of the lens group to block inflow of foreign substances or incidence of infrared rays. The imaging plane IP may provide a space in which light refracted by the first to fifth lenses 810 to 850 is imaged. The imaging plane IP may be formed on the image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

Figure 16:
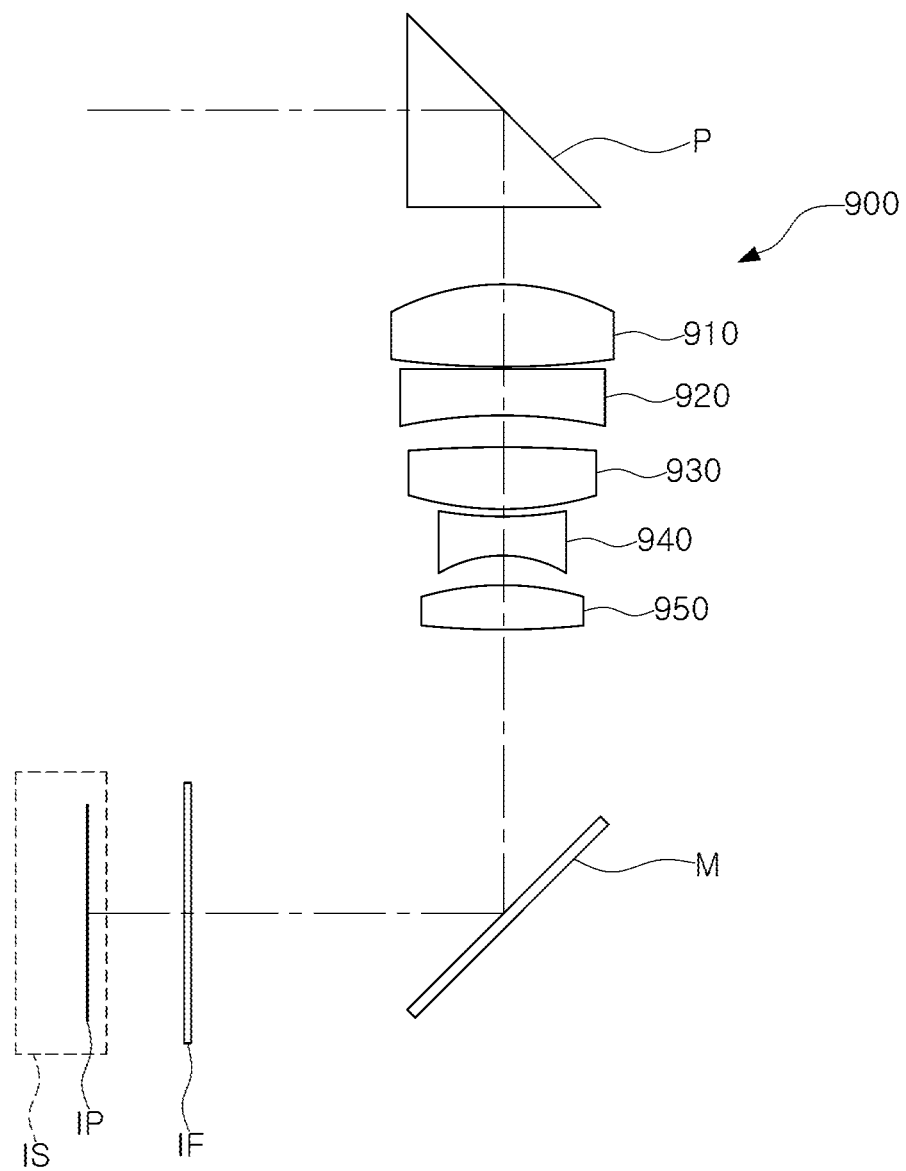
FIG. 16 is a view illustrating a configuration of an optical imaging system according to a ninth embodiment.

Next, an optical imaging system according to a ninth example embodiment will be described with reference to FIG. 16.

An optical imaging system 900 according to the present embodiment may include a plurality of optical path folding elements. For example, the optical imaging system 900 may include an optical path folding element in the form of a prism P and an optical path folding element in the form of a reflector M. The prism P is disposed on an object side of a lens group. The prism P refracts or reflects a path of light incident on the optical imaging system 900. The reflector M is disposed on an image side of the lens group. The reflector M may reflect a path of light exiting from the lens group toward an imaging plane IP.

The optical imaging system 900 may include a lens group including a plurality of lenses. For example, the optical imaging system may include a lens group including a first lens 910, a second lens 920, a third lens 930, a fourth lens 940, and a fifth lens 950.

The first lens 910 has positive refractive power and has a convex object-side surface and a convex image-side surface. The second lens 920 has negative refractive power and has a convex object-side surface and a concave image-side surface. The third lens 930 has positive refractive power and has a convex object-side surface and a convex image-side surface. The fourth lens 940 has negative refractive power and has a concave object-side surface and a concave image-side surface. The fifth lens 950 has positive refractive power and has a convex object-side surface and a convex image-side surface.

The optical imaging system 900 may further include a filter IF and an imaging plane IP.

The filter IF may be disposed on the image side of the lens group to block inflow of foreign substances or incidence of infrared rays. The imaging plane IP may provide a space in which light refracted by the first to fifth lenses 910 to 950 is imaged. The imaging plane IP may be formed on the image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

For reference, the optical imaging systems 800 and 900 according to the eighth and ninth embodiments may have substantially the same or similar optical characteristics as the optical imaging system 100 according to the first embodiment. For example, refractive power and shape of the first to fifth lenses of the optical imaging systems 800 and 900 may be the same as or similar to the refractive power and shape of the first to fifth lenses 110 to 150 of the optical imaging system 100 according to the first embodiment. As another example, the values of Conditional Expressions of the optical imaging system 800 and 900 may be the same as or similar to the values of Conditional Expressions of the optical imaging system 100 according to the first embodiment.

Table 15 illustrates the optical characteristics of the optical imaging systems according to the first to seventh embodiments, and Table 16 illustrates values of Conditional Expressions of the optical imaging systems according to the first to seventh embodiments.

TABLE 15

| Remark | First example | Second example | Third example | Fourth example | Fifth example | Sixth example | Seventh example |
|---|---|---|---|---|---|---|---|
| f1 | 10.5910 | 9.5400 | 8.5480 | 14.1540 | 14.1570 | 113.4850 | 113.3840 |
| f2 | −46.1410 | −27.7030 | −17.9990 | 17.4720 | 23.6280 | 18.5670 | 12.5910 |
| f3 | 13.7330 | 13.3900 | 13.8770 | −3.3450 | −3.3390 | 16.0030 | −30.0680 |
| f4 | −3.2630 | −3.2230 | −3.4800 | 7.5450 | 6.7470 | −3.6370 | 10.8110 |
| f5 | 8.0860 | 7.7300 | 8.6690 | — | — | 7.8820 | −3.4270 |
| f6 | — | — | — | — | — | — | 8.2290 |
| TTL | 27.0010 | 27.0010 | 27.0010 | 27.0015 | 27.0011 | 35.4010 | 35.5000 |
| f | 30.6000 | 30.6000 | 30.6000 | 30.6000 | 30.6000 | 30.6000 | 30.6000 |
| f number | 4.7000 | 4.6000 | 4.7000 | 4.7000 | 4.6000 | 4.6000 | 4.6000 |
| IMGHT | 2.9800 | 2.9800 | 2.9800 | 2.9800 | 2.9800 | 2.9800 | 2.9800 |

TABLE 16

| Conditional expression | First example | Second example | Third example | Fourth example | Fifth example | Sixth example | Seventh example |
|---|---|---|---|---|---|---|---|
| TTL/f | 0.8824 | 0.8824 | 0.8824 | 0.8824 | 0.8824 | 1.1569 | 1.1601 |
| f/IMGHT | 10.2685 | 10.2685 | 10.2685 | 10.2685 | 10.2685 | 10.2685 | 10.2685 |
| NGR | 1.6550 | 1.6550 | 1.6550 | 1.6550 | 1.6550 | 1.6550 | 1.6550 |
| NGF | 1.5350 | 1.5350 | 1.5350 | 1.5350 | 1.5350 | 1.5350 | 1.5350 |
| NGR − NGF | 0.1200 | 0.1200 | 0.1200 | 0.1200 | 0.1200 | 0.1200 | 0.1200 |
| f/f1 | 2.8892 | 3.2075 | 3.5798 | 2.1619 | 2.1615 | 0.2696 | 0.2699 |
| f/f2 | −0.6632 | −1.1046 | −1.7001 | 1.7514 | 1.2951 | 1.6481 | 2.4303 |
| f/fr1 | 3.7843 | 3.9586 | 3.5298 | 4.0557 | 4.5353 | 3.8823 | 3.7186 |
| f/fr2 | −9.3779 | −9.4943 | −8.7931 | −9.1480 | −9.1644 | −8.4135 | −8.9291 |

As set forth above, according to the example embodiments, the optical imaging system having a high resolution and a high magnification may be realized.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
an optical path folding element; and
at least four lenses disposed from an object side of the optical imaging system toward an imaging plane of the optical imaging system,
wherein a rearmost lens disposed closest to the imaging plane in the optical imaging system has positive refractive power, and a rearward lens disposed closest to an object side of the rearmost lens has negative refractive power,
wherein a foremost lens in the optical imaging system has positive refractive power, and
wherein 2.0<f/f1<4.0,
where f is a focal length of the optical imaging system, and f1 is a focal length of the foremost lens of the optical imaging system.

2. The optical imaging system of claim 1, wherein a refractive index of the rearmost lens is greater than 1.63 and less than 1.69.

3. The optical imaging system of claim 1, wherein a refractive index of the rearward lens is greater than 1.63 and less than 1.69.

4. The optical imaging system of claim 1, wherein the rearmost lens has a convex object-side surface.

5. The optical imaging system of claim 1, wherein the rearmost lens has a convex image-side surface.

6. The optical imaging system of claim 1, wherein the rearward lens has a concave object-side surface.

7. The optical imaging system of claim 1, wherein the rearward lens has a concave image-side surface.

8. The optical imaging system of claim 1, wherein 8.0<f/IMGHT<12.0,
where f is a focal length of the optical imaging system and IMGHT is a height of the imaging plane.

9. An optical imaging system, comprising:
an optical path folding element; and
at least four lenses disposed from an object side of the optical imaging system toward an imaging plane of the optical imaging system,
wherein:

0.1<NGR−NGF<0.16, and 2.0<f/f1<4.0, where f is a focal length of the optical imaging system, f1 is a focal length of a foremost lens of the optical imaging system, NGR is an average of a refractive index of the rearmost lens disposed closest to the imaging plane in the optical imaging system and a refractive index of the rearward lens disposed closest to the object side of the rearmost lens in the optical imaging system, and NGF is an average of refractive indices of lenses excluding the rearmost lens and the rearward lens of the optical imaging system.

10. The optical imaging system of claim 9, wherein the rearmost lens has positive refractive power.

11. The optical imaging system of claim 9, wherein the rearward lens has negative refractive power.

12. The optical imaging system of claim 9, wherein the optical path folding element is disposed between two of the at least four lenses.

13. The optical imaging system of claim 9, wherein the rearward lens has a concave object-side surface.

14. The optical imaging system of claim 9, wherein $1.50 < NGF < 1.56$.

15. The optical imaging system of claim 9, wherein $8.0 < f/IMGHT < 12.0$, where f is a focal length of the optical imaging system and IMGHT is a height of the imaging plane.

16. An optical imaging system, comprising:
an optical path folding element; and
at least four lenses disposed from an object side of the optical imaging system toward an imaging plane of the optical imaging system,
wherein a rearmost lens of the optical imaging system, and a first rearward lens disposed closest to an object side of the rearmost lens of the optical imaging system each have a refractive index greater than 1.63 and less than 1.69,
wherein a second rearward lens disposed closest to an object side of the first rearward lens has a convex object-side surface and a convex image-side surface, and
wherein $2.0 < f/f1 < 4.0$,
where f is a focal length of the optical imaging system, and f1 is a focal length of a foremost lens of the optical imaging system.

17. The optical imaging system of claim 16, wherein the rearmost lens has positive refractive power.

18. The optical imaging system of claim 16, wherein the first rearward lens has negative refractive power.

19. The optical imaging system of claim 16, wherein the foremost lens of the optical imaging system disposed closest to an object has positive refractive power.

* * * * *